Figure 1:
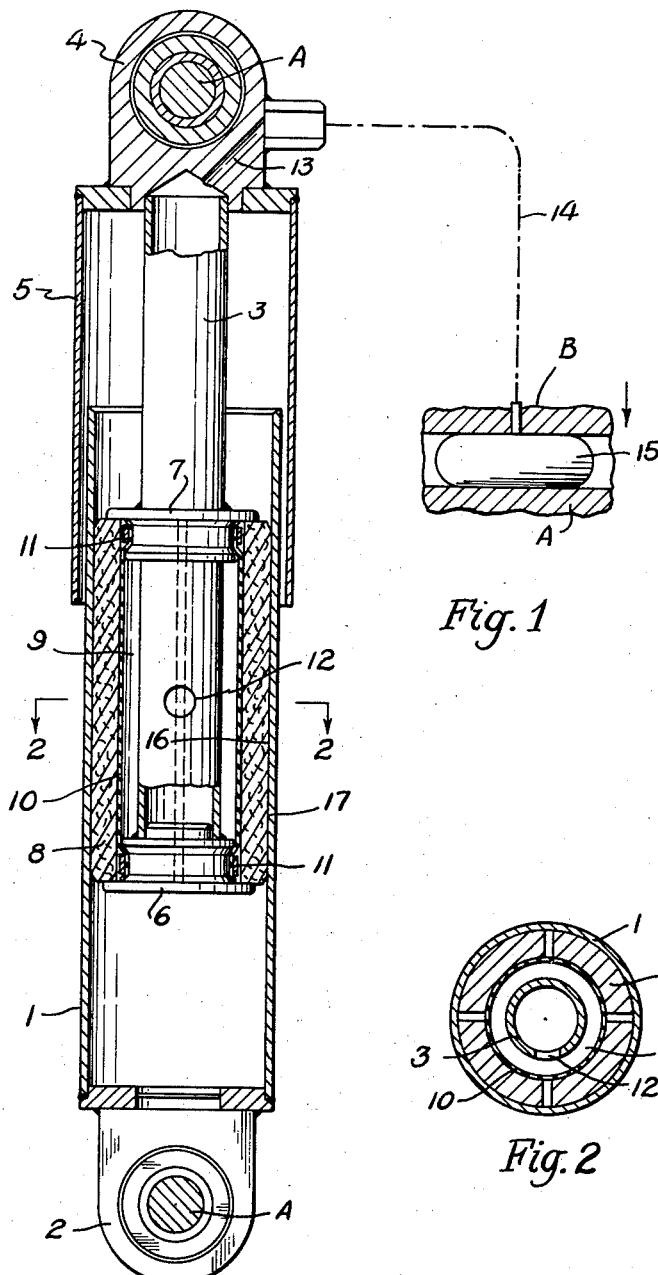

INVENTORS
Heinz Fahlbusch
Franz Hofer

United States Patent Office 3,059,916
Patented Oct. 23, 1962

3,059,916
SHOCK ABSORBER
Heinz Fahlbusch and Franz Hofer, Nurnberg, Germany, assignors to Maschinenfabrik Augsburg-Nurnberg A.G., Nurnberg, Germany
Filed July 12, 1961, Ser. No. 123,586
Claims priority, application Germany Aug. 17, 1960
2 Claims. (Cl. 267—9)

This invention relates to shock absorbers and, in particular, to shock absorbers for vehicles.

It is well known to mount shock absorbers parallel to the springs of vehicles. This is especially so for springs that have little or no properties of absorption as, for example, air springs or spiral springs. As a rule, these latter must be coupled in parallel to a shock absorber so that the movement between the sprung and unsprung positions due to the weight of the vehicle is damped as quickly as possible.

If the load on the spring is changed, as when a vehicle is loaded at one time and emptied at another time, the absorption characteristic of the spring is changed if it cannot adjust to the varied load condition. Since an equal absorption characteristic is desirable in many cases, irrespective of the amount of load on the spring, a so-called load-dependent spring regulator has been made.

There is also a corresponding shock absorber regulator. The shock absorber is provided with a regulating device in which the absorption characteristics of the shock absorber can be determined in response to a spring corresponding to the load and mounted parallel to the shock absorber. Such shock absorber is a hydraulic absorber with a manual throttle adjustment.

The object of this invention is to produce a friction shock absorber which can be regulated according to the demand placed on the absorber and especially with the changing requirements of a spring under a load.

This invention is therefore directed to a shock absorber for vehicles in which the absorber has two vibration damping parts which are movable against one another by overcoming a frictional force. The frictional surface of one of the parts can be pressed against the friction surface of the other part by a regulated pressure means having a varying normal pressure.

The friction surface of the part upon which the adjustable pressure means acts is a radially expandable friction element including a housing positioned between the axially displaceable and telescoped cylindrical members of the shock absorber with the friction element movable with respect to one of the shock absorber parts but not to the other. The frictional pieces are spaced from one another and secured to another tube secured to one of the shock absorber parts. By changing the interior pressure of the rubber tube, the force with which one of the friction absorbing parts is pressed against the other part is changed and thereby the shock absorbing characteristic of the shock absorber is changed.

In the construction of this invention, the load on the spring is used to adjust the pressure between the two friction surfaces and the shock absorber thus serves to damp the vibrations of the spring.

This provides a simple solution to the problem in that the adjustment of the shock absorber is from the spring itself which, in turn, is adjusted in a known manner depending on the load.

It is old in the art to adjust a shock absorber from a spring. However, such has only been done with a hydraulic damping means, whereas this invention utilizes the force of friction as a damping means.

When the shock absorber of this invention is mounted parallel to a pneumatic spring having its pressure regulated according to the load on the spring, then according to another feature of this invention, the interior of the rubber tube in the shock absorber communicates through a hose with the pressure chamber of the pneumatic spring.

Figure 2:
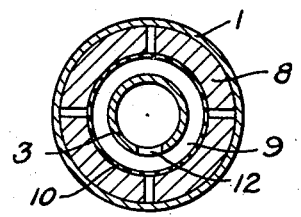

The means by which the objects of the invention are obtained are disclosed more fully with respect to the accompanying drawings, in which:

FIGURE 1 is a vertical cross-sectional view through the shock absorber of this invention; and FIGURE 2 is a cross-sectional view taken on the line 2—2 of FIGURE 1.

In general, the shock absorber is composed of two parts telescoped and axially displaceable against one another. One part of the shock absorber is a cylinder 1 adapted to be attached through an eye 2 to a portion A of the wheel frame of the vehicle carrying the weight of the spring. The other shock absorber portion is a hollow rod 3 extending into cylinder 1 and having at its outer end an eye 4 by means of which the shock absorber is attached to the under carriage of the vehicle. A dust cover 5 is secured to the eye 4 and is telescoped over cylinder 1.

Flanges 6 and 7 secured to rod 3 hold between them a plurality of spaced cylindrical segments 8 composed of friction material and longitudinally movable with rod 3. Between the segments 8 and rod 3 is a circular chamber 9 which is enclosed in an air-tight rubber tube 10 and is fastened by clamps 11 to rod 3. The rubber tube 10 and segments 8 constitute a radially expandable friction element.

The chamber 9 communicates through a port 12 in rod 3 and a bore 13 in eye 4 through a pipe 14 to the interior of air cushion spring 15 for the purpose of damping the relative movement between the unsprung weight and the sprung weight of the vehicle parts A and B as quickly as possible. In this way, the same air pressure is always maintained in chamber 9 and air cushion spring 15. This pressure expands tube 10 and presses the friction surface of segment 16 of segments 8 uniformly against the friction surface 17 of cylinder 1 so that the two relatively movable parts 3 and 1 of the shock absorber can be displaced only after they overcome the frictional force between surfaces 16 and 17.

The air pressure in spring 15 is regulated by conventional means in such a manner that the same spacing is maintained between the parts A and B of the vehicle independently of the load on the vehicle. Thus the air pressure of the spring 15 is dependent upon the load. The pressure in chamber 9 is also dependent upon the load on the vehicle and the friction pressure on surfaces 16 and 17 are dependent on the pressure in chamber 9, so that finally the shock absorbing characteristics are dependent upon the load as they are regulated by the pressure of the air spring.

Having now described the means by which the objects of the invention are obtained,

We claim:

1. A vehicle shock absorber comprising a pair of telescoped cylinders relatively movable with respect to each other, a plurality of separated friction segments positioned between said cylinders and axially movable in contact with one of the cylinders, a tube secured to said segments and inflatable to various pressures, fastening means for fixing said tube to the other of said cylinders, an air cushion spring for providing a source of variable air pressure, and means for communicating the variable air pressure of said spring to said tube for regulating the pressure of said friction segments against said one of the cylinders.

2. A shock absorber as in claim 1, said air cushion spring being variably pressurized in accordance with the load on said spring, said spring and shock absorber being positioned parallel to each other, and said means for communicating comprising a passageway between said spring and the interior of said tube.

References Cited in the file of this patent

UNITED STATES PATENTS

| | | |
|---|---|---|
| 2,497,829 | Baselt | Feb. 14, 1950 |
| 2,928,507 | Thompson | Mar. 15, 1960 |
| 2,994,442 | Frederick | Aug. 1, 1961 |

FOREIGN PATENTS

| | | |
|---|---|---|
| 25,283 | France | Oct. 3, 1922 |

(First addition to 546,995)